United States Patent [19]

Rudert et al.

[11] 3,872,327

[45] Mar. 18, 1975

[54] DRIVE CIRCUIT FOR PULSE WIDTH MODULATED D.C. - D.C. CONVERTORS

[75] Inventors: Bernhardt Siegfried Rudert, Sandton; John Trafford Rowe Freeman, Roodepoort, both of South Africa

[73] Assignee: Inpel (Proprietary) Limited, Johannesburg, South Africa

[22] Filed: Oct. 11, 1973

[21] Appl. No.: 405,560

[30] Foreign Application Priority Data

Oct. 16, 1972 South Africa ........................ 72/7334

[52] U.S. Cl. .................... 307/300, 307/254, 307/296

[51] Int. Cl. ............................................ H03k 17/60

[58] Field of Search ............ 307/300, 254, 253, 296

[56] References Cited

UNITED STATES PATENTS

| | | | |
|---|---|---|---|
| 3,078,379 | 2/1963 | Plogstedt et al. | 307/254 |
| 3,089,041 | 5/1963 | Boensel | 307/300 X |
| 3,113,296 | 12/1963 | Perry et al. | 307/300 |
| 3,183,370 | 5/1965 | Trampel | 307/300 X |
| 3,200,343 | 8/1965 | Skinner | 307/300 |
| 3,299,290 | 1/1967 | Moll | 307/300 X |
| 3,350,577 | 10/1967 | Moore et al. | 307/254 |
| 3,439,189 | 4/1969 | Petry | 307/253 X |

*Primary Examiner*—Michael J. Lynch
*Assistant Examiner*—B. P. Davis
*Attorney, Agent, or Firm*—Irwin M. Aisenberg

[57] ABSTRACT

A method of operating a power output transistor comprises interrupting the emitter current of this transistor simultaneously with the base drive current and immediately thereafter allowing the collector current, due to stored charge in the base collector-junction, to flow through the base and thence through a low source impedance during extraction of this stored charge.

6 Claims, 4 Drawing Figures

PATENTED MAR 18 1975

3,872,327

DRIVE CIRCUIT FOR PULSE WIDTH MODULATED D.C. - D.C. CONVERTORS

BACKGROUND OF THE INVENTION

THIS INVENTION relates to base drive circuits for d.c. - d.c. convertors and more particularly to drive circuits for transistorised d.c. - d.c. convertors using pulse width modulation.

High voltage switching transistors used at relatively high frequencies, require to have very fast turn-on and turn-off times. Presently available devices used in the conventional way generally have high switching losses if operated at frequencies above 20 KHz. The conventional switching method comprises a base drive circuit which provides a sufficiently heavy forward base current to turn on the device and a heavy reverse base current to turn off the device. The reverse base current, apart from being very inconvenient from the design point of view, is still not adequate for very fast turn-off. An alternative method used to date with the object of improving the turn-off time of the high voltage transistors is the so called emitter switching method. This method requires a suitable, fixed and separate base voltage supply, which from the design point of view is also not very convenient.

SUMMARY OF THE INVENTION

The object of the present invention is to provide circuitry which will overcome the above undesirable effects to within acceptable limits for d.c. - d.c. convertors.

According to this invention there is provided a method of operating a power output transistor which method comprises interrupting the emitter current simultaneously with the base drive current and immediately thereafter allowing the collector current due to stored charge in the base - collector junction, to flow through the base and thence through a low source impedance during extraction of the said stored charge.

Further features of the invention provide for the emitter current to be interrupted by means of a fast acting electronic switch and for the base drive current to be derived from a voltage source through a series dropping resistance whereby the voltage source can also be the drive signal for the power output transistor.

An alternative feature of this provision of the invention provides for the base drive current to be derived from a fixed voltage source with an electronic current source which is switched simultaneously with the drive signal for the power output transistor.

The invention further provides a bridge type driving circuit which maintains two transistors conducting during the turn-off and the off periods to maintain a zero drive voltage.

The invention also provides a circuit for effecting the method as above defined, the circuit comprising a power output transistor, a fast acting electronic switch in the emitter of the power output transistor, a base drive current source for the power output transistor and a low source impedance connected to the base of the power output transistor adapted to allow current flow from the base only in the absence of base drive and emitter currents.

BRIEF DESCRIPTION OF THE DRAWINGS

Two preferred embodiments of this invention are described below by way of example only with reference to the accompanying drawings in which.

DESCRIPTION OF THE PREFERRED EMBODIMENTS

Figure 1:
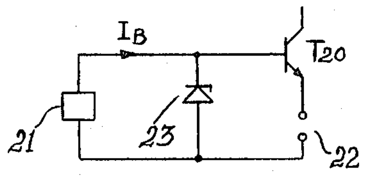
FIG. 1 is a circuit diagram illustrating the method according to this invention wherein the base drive current for a power output transistor is derived from a current source.

With reference to FIG. 1 a method of operating a power output transistor T20 is illustrated wherein the base drive current $I_B$ for the transistor T20 is supplied by a current source 21. A switch 22 is connected to the emitter of the power output transistor T20. The power output transistor is turned on by providing the base drive current and simultaneously closing the switch 22. The power output transistor is turn off by interrupting the base drive current and simultaneously opening the switch 22. Immediately after $I_B$ is interrupted and the switch opened, the base current due to stored charge in the base-collector junction is allowed to flow through the zener diode 23.

Figure 2:
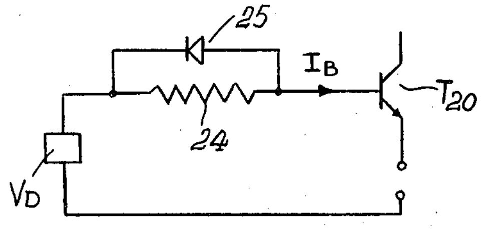
FIG. 2 is a circuit diagram illustrating the method according to this invention wherein a simulated current source is used.

With reference to FIG. 2 the method is substantially the same as that outlined above except that a simulated current source is used. The base drive current $I_B$ is derived from a voltage source $V_D$ through a series dropping resistance 24. When the switch 22 is opened and $I_B$ discontinued the base current due to stored charge in the base collector junction is allowed to flow through a diode 25. The voltage source $V_D$ is also the drive signal for the power output transistor T20 and it has a positive going voltage during its on period and zero voltage during its off period.

In both cases, as outlined above, the switch can be a fast acting switching transistor or any other fast acting switching semiconductor device, for instance a field effect transistor.

Two specific and convenient practical circuits are now outlined based on the method as outlined above.

Figure 3:
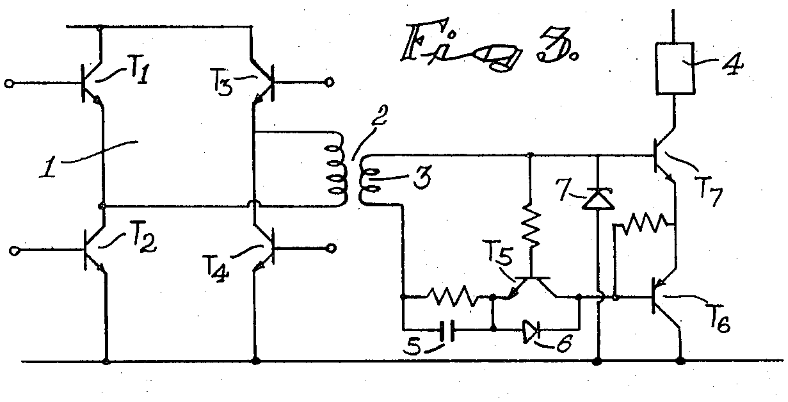
FIG. 3 is a practical circuit based on the method as illustrated in FIG. 1.

With reference to FIG. 3, Transistors T1, T2, T3, and T4 make up a bridge drive circuit 1. When the output power transistor of the d.c. - d.c. convertor which is shown at T7 is to be in the off condition, the circuit can be arranged so that either T1 and T3 are on or that T2 and T4 are on. Thus with appropriate freewheeling diodes the output impedance of transformer 2 during the off condition is very low. During the on condition an output voltage occurs at the secondary 3 of transformer 2 when either T1 and T4 are conducting or T2 and T3 are conducting.

In the on condition of T7, the output voltage of the transformer 2 is positive turning on T5, T6 and T7 and a speed up capacitor 5 is provided as shown. When the output voltage of transformer 2 drops to zero T5 is turned off immediately and shortly afterwards T6. The reverse turn off current required to turn off T6 flows through diode 6 and immediately after T6 has turned off the collector current of T7 is forced to flow through zener diode 7 until the stored charge in the collector base junction of T7 has been extracted.

It will be appreciated that the transistor T6 which acts as a transistor switch in the emitter of output transistor T7 must be a faster acting device than the latter. Also T5 should be of the same type and have the same order of speed of operation as T6. The circuit components must also ensure that no emitter current can flow in output transistor T7 during and after turning off, because the negative emitter base voltage of this transistor can rise to a high level.

Figure 4:
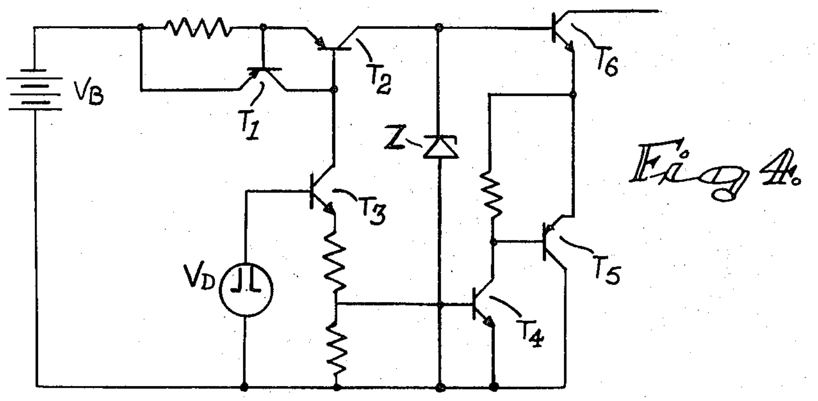
FIG. 4 is a further practical circuit based on the method as illustrated in FIG. 1.

With reference to FIG. 4 transistor T6 is the output power transistor to be switched. Upon the arrival of a positive going drive signal at the voltage source $V_D$, T3 is turned on, which in turn provides the drive signal for T4 and T5 and also the current regulator T1 and T2. Thus T6 is turned on. When the drive signal $V_D$ drops to zero volts, T3 turns off and consequently T2 and T5 turn off immediately because both of these are fast acting devices. The reverse base current of T6 which subsequently flows because of the stored charge in the base-collector junction now flows through the zener diode Z. The supply $V_B$ can be any d.c. supply and could be derived by means of rectification from the a.c. output voltage in the case where this drive circuit is used in an invertor or d.c. - d.c. converter.

Both of the arrangements outlined above ensure a very fast decay of the collector current of the output power transistor and switching losses are consequently reduced considerably.

What I claim as new and desire to secure by Letters Patent is:

1. A method of operating a power output transistor which method comprises interrupting the emitter current of said transistor simultaneously with the base drive current and immediately thereafter allowing the collector current, due to stored charge in the base collector junction, to flow through the base and thence through a low source impedance during extraction of the said stored charge.

2. A method as claimed in claim 1 wherein the emitter current is interrupted by means of a fast acting electronic switch.

3. A method as claimed in claim 1 in which the base drive current is derived from a voltage source through a series dropping resistance whereby the voltage source is also the drive signal for the power output transistor.

4. A method as claimed in claim 1 in which the base drive current is derived from a fixed voltage source with an electronic current source which is switched simultaneously with the drive signal for the power output transistor.

5. A circuit for effecting the method as claimed in claim 1, the circuit comprising a power output transistor, a fast acting electronic switch in the emitter of the power output transistor, a base drive current source for the power output transistor and a low source impedance connected to the base of the power output transistor adapted to allow current flow from the base only in the absence of base drive and emitter currents.

6. A bridge type driving circuit for use with the circuit as claimed in claim 5 wherein the bridge type driving circuit maintains two transistors conducting during the periods when the emitter current is interrupted and is zero in order to maintain a zero drive voltage.

* * * * *